(12) United States Patent
Gao et al.

(10) Patent No.: US 11,569,540 B2
(45) Date of Patent: Jan. 31, 2023

(54) PACKAGING FILM, BATTERY MODULE, AND MOBILE TERMINAL

(71) Applicant: Huawei Technologies Co., Ltd., Shenzhen (CN)

(72) Inventors: Zongyu Gao, Dongguan (CN); Hongxing Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 16/757,931

(22) PCT Filed: Oct. 27, 2017

(86) PCT No.: PCT/CN2017/108122
§ 371 (c)(1),
(2) Date: Apr. 21, 2020

(87) PCT Pub. No.: WO2019/080121
PCT Pub. Date: May 2, 2019

(65) Prior Publication Data
US 2020/0266399 A1    Aug. 20, 2020

(51) Int. Cl.
*H01M 50/20* (2021.01)
*H04M 1/02* (2006.01)

(52) U.S. Cl.
CPC ......... *H01M 50/20* (2021.01); *H04M 1/0262* (2013.01); *H01M 2220/30* (2013.01)

(58) Field of Classification Search
CPC .................. H04M 1/0262; H01M 2220/30
See application file for complete search history.

(56) References Cited

U.S. PATENT DOCUMENTS

2019/0006641 A1    1/2019   Ye et al.

FOREIGN PATENT DOCUMENTS

| CN | 105219286 A | 1/2016 |
|---|---|---|
| CN | 205384821 U | 7/2016 |
| CN | 107068938 A | 8/2017 |
| CN | 206388762 U | 8/2017 |
| CN | 206451750 U | 8/2017 |
| CN | 207116488 U | 3/2018 |
| JP | 3120178 U | 3/2006 |
| JP | 2012006613 A | 1/2012 |
| JP | 2015093691 A | 5/2015 |
| JP | 2015211022 A | 11/2015 |
| JP | 2017134887 A | 8/2017 |
| JP | 6211694 B2 | 10/2017 |
| WO | 2015182050 A1 | 12/2015 |
| WO | 2015186285 A1 | 12/2015 |

*Primary Examiner* — Maria Laios
*Assistant Examiner* — Jordan E Berresford
(74) *Attorney, Agent, or Firm* — Conley Rose, P.C.

(57) ABSTRACT

A packaging film includes a packaging portion and a pulling portion, and the pulling portion and the packaging portion are demarcated by a tear line. When the pulling portion is pulled, the tear line is disconnected, and the pulling portion is separated from the packaging portion. In a packaging face of the packaging portion, an area packaging a side wall of the battery is a glue-free area, and other areas are provided with a first adhesive. An adhesive face in the packaging portion is provided with a second adhesive. A part of the packaging face in the pulling portion is provided with a third adhesive, and the adhesive face in the pulling portion is a glue-free area.

20 Claims, 5 Drawing Sheets

PACKAGING FILM, BATTERY MODULE, AND MOBILE TERMINAL

CROSS-REFERENCE TO RELATED APPLICATIONS

This application is a National Stage of International Patent Application No. PCT/CN2017/108122 filed on Oct. 27, 2017, which is hereby incorporated by reference in its entirety.

TECHNICAL FIELD

This application relates to the technical field of mobile terminals, and in particular, to a packaging film, a battery module, and a mobile terminal.

BACKGROUND

A battery is indispensable for a mobile terminal. In other approaches, a battery needs to be placed in a battery compartment of a mobile terminal, and the battery needs to be fastened. In the other approaches, the battery can be fastened in various manners. A fastening manner shown in FIG. 1 is a tape 3 scheme. To be specific, a battery 2 is bonded to a battery compartment 1 by using the tape 3, achieving a high bonding strength. However, in this manner, the battery 2 is not easy to remove for repair, and a tool is needed. During the removal, a package of the battery 2 is easily damaged, causing a safety hazard.

In addition, FIG. 2 shows a fastening manner of using an easy-pull tape 4. To be specific, the battery 2 is bonded to the battery compartment 1 by using the easy-pull tape 4. When the battery 2 is to be removed, a handle 7 of the easy-pull tape 4 is pulled, and stickiness of the easy-pull tape 4 decreases during the pulling. The battery 2 is removed after the easy-pull tape 4 is pulled out. However, a pull-out yield of the easy-pull tape 4 is greatly affected by thickness of the easy-pull tape 4 and a pull-out angle, and therefore a requirement is imposed on an architecture design of the battery compartment 1. Compared with a gum tape scheme, this manner has higher costs.

Moreover, FIG. 3 shows a scheme of using battery packaging. The battery 2 is packaged by using a detachable packaging film 5, a handle structure 6 is added to the battery 2, and the detachable packaging film 5 is bonded to the battery compartment 1 by using a common tape 3. When the battery 2 is to be removed, the handle structure 6 is pulled after the detachable packaging film 5 is opened, so that the battery 2 is separated from the detachable packaging film 5, and the battery 2 is removed. However, in this scheme, the detachable packaging film 5 is separated from the handle structure 6. Consequently, production process and mounting process are complex, and costs are high.

SUMMARY

This application provides a packaging film, a battery module, and a mobile terminal, so as to provide a simple battery removal structure.

According to a first aspect, a packaging film is provided. The packaging film includes a packaging portion and a pulling portion, and the pulling portion and the packaging portion are demarcated by a tear line. When the pulling portion is pulled, the tear line is disconnected, and the pulling portion is separated from the packaging portion.

The packaging film has a packaging face facing a battery and an adhesive face facing a battery compartment.

In the packaging face of the packaging portion, an area packaging a side wall of the battery is a glue-free area, and a second area other than the glue-free area is provided with a first adhesive.

The adhesive face of the packaging portion is provided with a second adhesive, and an adhesive force of the first adhesive is less than an adhesive force of the second adhesive.

A part of the packaging face in the pulling portion is provided with a third adhesive, and the adhesive face in the pulling portion is a glue-free area.

In the foregoing implementation solution, the packaging film is in a one-piece structure, and the tear line segments the packaging film into two different areas. When the battery needs to be removed, only the pulling portion obtained through demarcation by the tear line needs to be pulled, to separate the pulling portion from the packaging portion and pull the battery out of the battery compartment. This facilitates removal of the battery and facilitates production and processing of the packaging film.

In a specific implementation solution, the third adhesive is the same as the first adhesive.

In a specific implementation solution, the third adhesive is different from the first adhesive. An adhesive force of the third adhesive is greater than the adhesive force of the first adhesive. Adhesive forces are different, and an adhesive force between the pulling portion and the battery is greater than an adhesive force between the packaging portion and the battery. This further ensures smooth pull-out of the battery.

In a specific implementation solution, there are two tear lines, and the two tear lines are arranged in parallel. The packaging film is provided with a through hole, and each tear line extends to the through hole. With the two tear lines and the through hole that are provided, the pulling portion can be separated from the packaging portion when a force is applied, so that the battery can be pulled out.

In a specific implementation solution, there is one tear line, the tear line is U-shaped, and two ends of the tear line extend to the same side of the packaging film. With the U-shaped tear line that is provided, the pulling portion can be separated from the packaging portion when a force is applied, so that the battery can be pulled out.

In a specific implementation solution, one side of the packaging film has a protrusion portion that extends beyond a side edge of the packaging film, and the tear line extends to the protrusion portion.

In a specific implementation solution, an edge position of the protrusion portion is provided with a notch connected to each tear line. This facilitates separation of the pulling portion from the packaging portion.

In a specific implementation solution, a part that is of the pulling portion and that extends to the protrusion portion is a glue-free area. This facilitates removal of the battery.

In a specific implementation solution, the pulling portion is partially outside the protrusion portion. This helps to apply a force to the pulling portion, and further facilitates removal of the battery.

In a specific implementation solution, a glue-free area on the packaging face segments the first adhesive into three parallel areas. This improves a packaging effect.

In a specific implementation solution, the tear line is a double-layer tear line. This facilitates separation of the pulling portion from the packaging portion.

In a specific implementation solution, a protective film is attached to an adhesive face of the packaging film, to protect the second adhesive.

In a specific implementation solution, the adhesive face of the packaging film is provided with a plurality of adhesive areas, and each adhesive area is provided with the second adhesive. This improves an adhesive effect.

In a specific implementation solution, the pulling portion is disposed at a middle position on one side of the packaging film. This facilitates pull-out of the battery.

In a specific implementation solution, the pulling portion spans the side wall of the battery, and one side of the side wall of the battery is a glue-free area and the other side is a glue area.

According to a second aspect, a battery module is provided. The battery module includes a battery and the packaging film for packaging the battery according to any one of the foregoing implementation solutions.

In the foregoing implementation solutions, the packaging film is in a one-piece structure, and the tear line segments the packaging film into two different areas. When the battery needs to be removed, only the pulling portion obtained through demarcation by the tear line needs to be pulled, to separate the pulling portion from the packaging portion and pull the battery out of the battery compartment. This facilitates removal of the battery and facilitates production and processing of the packaging film.

According to a third aspect, a mobile terminal is provided. The mobile terminal includes a housing, a battery compartment disposed in the housing, and a battery fastened in the battery compartment. The battery is packaged with the packaging film according to any one of the foregoing implementation solutions.

In the foregoing implementation solutions, the packaging film is in a one-piece structure, and the tear line segments the packaging film into two different areas. When the battery needs to be removed, only the pulling portion obtained through demarcation by the tear line needs to be pulled, to separate the pulling portion from the packaging portion and pull the battery out of the battery compartment. This facilitates removal of the battery and facilitates production and processing of the packaging film.

DESCRIPTION OF EMBODIMENTS

To make the objectives, technical solutions, and advantages of this application clearer, the following further describes this application in detail with reference to the accompanying drawings.

Figure 4:
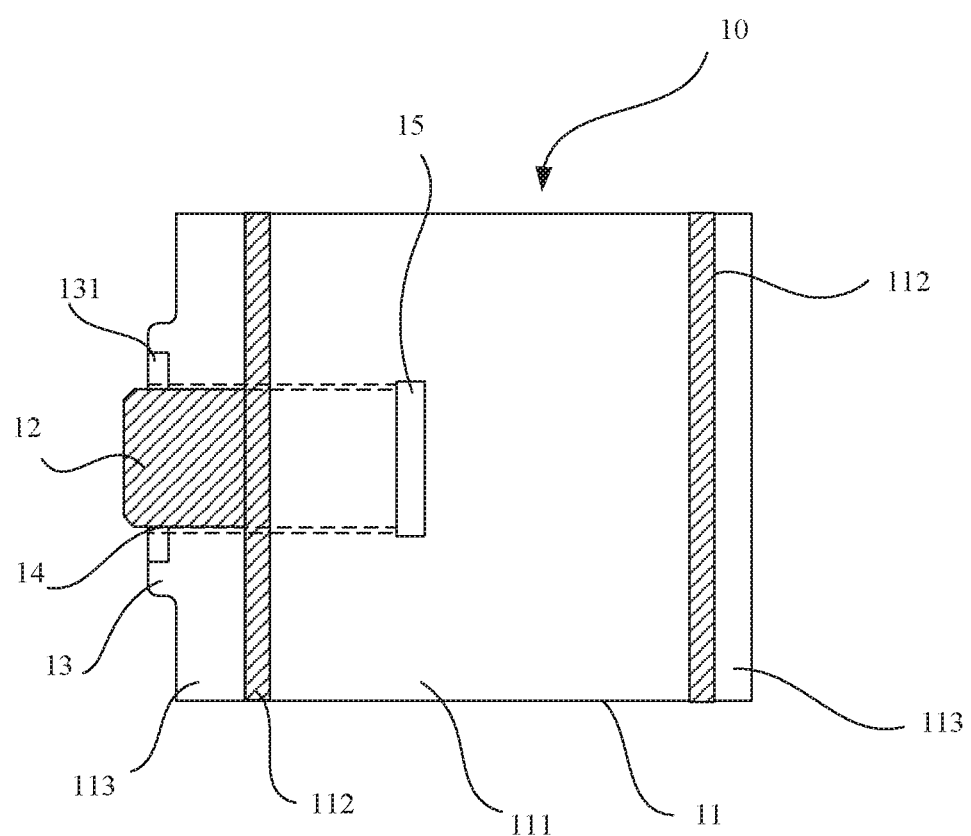
FIG. 4 is a schematic diagram of a packaging face of a packaging film according to an embodiment of this application.
Figure 7:
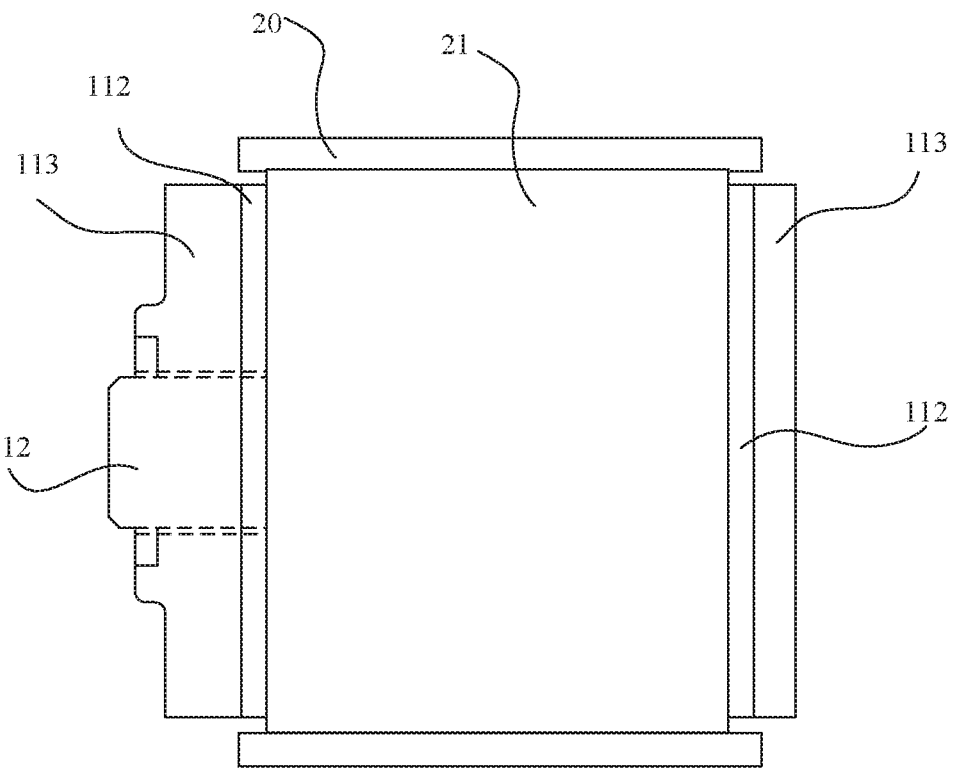
FIG. 7 is a reference diagram of a use state of a packaging film according to an embodiment of this application.

The following is illustrated with reference to FIG. 4 and FIG. 7. FIG. 4 shows a structure without a packaging film provided in an embodiment of this application, and FIG. 7 shows a schematic diagram of the cooperation of the packaging film in this embodiment of this application with a battery when the packaging film packages the battery.

In order to facilitate understanding of the packaging film provided in this embodiments of this application, four faces on a battery 20, except for surfaces at two ends, are named first. When the battery 20 is placed in a battery compartment, a face facing the battery compartment is a bottom of the battery 20, namely, a first surface (shown in the figure). A face opposite to the first surface is a second surface 21, and two faces adjacent to the first surface and the second surface 21 are side faces.

Figure 5:
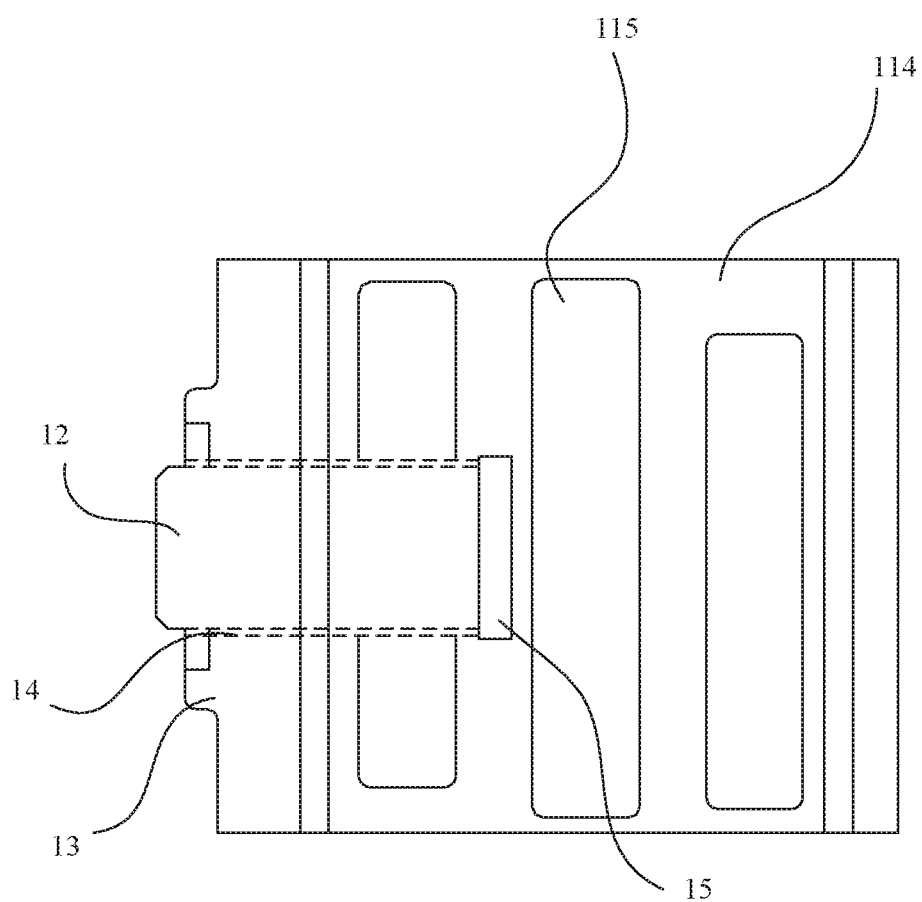
FIG. 5 is a schematic diagram of an adhesive face of a packaging film according to an embodiment of this application.

First referring to FIG. 4 and FIG. 5, a packaging film 10 provided in an embodiment of this application adopts is in a one-piece structure. The packaging film 10 has two opposite faces: an adhesive face and a packaging face. A face shown in FIG. 4 is the packaging face. When the packaging film 10 packages the battery 20, a face facing the battery 20 is the packaging face. A face shown in FIG. 5 is an adhesive face. The adhesive face is a face opposite to the packaging face. When the battery 20 is placed in the battery compartment, the adhesive face faces the battery compartment and is bonded to the battery compartment.

After a relative relationship between the adhesive face and the packaging face of the packaging film 10 is described, an area structure of the packaging film 10 is described below. It should be understood that each area structure obtained through demarcation of the packaging film 10 is an entity structure in the packaging film 10. The entity structure obtained through demarcation of the packaging film 10 includes a packaging portion 11 and a pulling portion 12. The packaging portion 11 has two faces and the two faces are the adhesive face and the packaging face of the packaging film 10. The pulling portion 11 has two faces and the two faces are the adhesive face and the packaging face of the packaging film 10.

Referring to the packaging film 10 in FIG. 4, the packaging film 10 of the battery 20 provided in this embodiment of this application is segmented into the packaging portion 11 and the pulling portion 12. The packaging portion 11 is used for packaging the battery 20, and the pulling portion 12 is used as an area for applying an external force when the battery 20 is being removed. A tear line 14 is provided on the packaging film 10 for distinguishing between two area structures. The tear line 14 is sculpted on the packaging film 10 to separate the packaging portion 11 from the pulling portion 12. In addition, the tear line 14 forms a partially disconnected and partially connected structure between the pulling part 12 and the packaging part 11. When the pulling part 12 is pulled by an external force, the tear line 14 is disconnected, so that the packaging part 11 can be disconnected from the pulling part 12, forming two independent structures.

When the packaging film 10 is connected to the battery 20, the packaging face in the packaging portion 11 is provided with a first adhesive (not labeled in the figure), and the packaging portion 11 is bonded to the battery 20 by the first adhesive, so that the packaging portion 11 can package the battery 20. In addition, when the battery 20 is being removed, to facilitate separation of the packaging film 10 from the battery 20, areas that are of the packaging face in the packaging portion 11 and that are used for packaging both side faces of the battery 20 are disposed as glue-free areas, shown as shaded areas in the packaging portion 11 in FIG. 4. A second area other than the glue-free areas is provided with the first adhesive. When the packaging film 10 packages the battery 20, the glue-free areas are not bonded to the battery 20, so as to separate the packaging film 10 from the battery 20. A third adhesive is also partially disposed in the packaging face of the pulling portion 12, ensuring that when the packaging portion 11 packages the battery 20, the pulling portion 12 can be bonded to the battery 20, and the battery 20 can be moved by pulling the pulling portion 12.

When the packaging film 10 packaging the battery 20 is placed into the battery compartment, the adhesive face of the packaging film 10 is provided with a second adhesive, and the packaging film 10 is bonded to a bottom of the battery compartment by the second adhesive. During specific disposing, an adhesive force of the first adhesive is less than an adhesive force of the second adhesive. In this disposing manner, when the battery 20 is being removed, the packaging film 10 can be bonded to the battery compartment without being pulled out along with the battery 20. In addition, to facilitate pull-out of the battery 20, the adhesive face in the pulling portion 12 is a glue-free area. In this way, when the packaging film 10 is fastened to the battery compartment, the pulling portion 12 is not bonded to the bottom of the battery compartment, to facilitate pull-out of the pulling portion 12.

It can be learned from the foregoing description that the packaging film 10 provided in this embodiment of this application is in a one-piece structure, and is segmented into two different areas by the tear line 14. When the battery 20 needs to be removed, the pulling portion 12 can be separated from the packaging portion 11 by simply pulling the pulling portion 12 obtained through demarcation by the tear line 14, and the battery 20 is pulled out of the battery compartment. This facilitates removal of the battery 20.

For detailed understanding of a specific structure and principle of the packaging film 10 provided in this embodiment of this application, the following provides detailed description with reference to the accompanying drawings.

Figure 8:
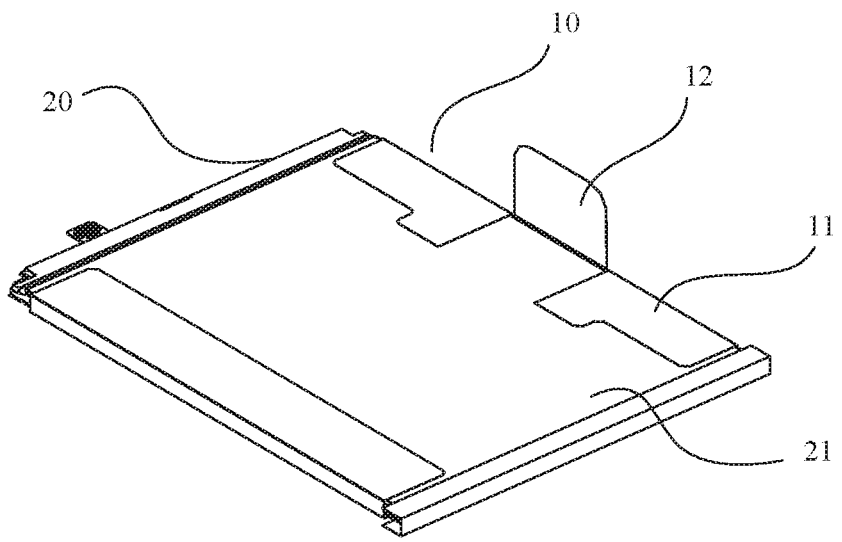
FIG. 8 is a schematic structural diagram of a battery module according to an embodiment of this application.

First, referring to FIG. 4 and FIG. 5, the packaging film 10 provided in this embodiment of this application is a packaging film in a one-piece structure, and the film includes two opposite faces: a packaging face and an adhesive face. As shown in FIG. 4, by function of packaging the battery 20, the packaging face is segmented into: a first surface packaging area 111 that is bonded to a first surface of the battery 20, side face packaging areas 112 that are bonded to two side faces, and second surface packaging areas 113 that are bonded to the second surface 21. As shown in FIG. 8, two second surface packaging areas 113 partially package the second surface 21 of the battery 20. As shown in FIG. 5, only an area of the adhesive face, opposite to the first surface packaging area 111, is provided with a first surface adhesive area 114, and other areas in the adhesive face are glue-free areas.

By function, the packaging film 10 is segmented into two parts: the packaging portion 11 and the pulling portion 12. The packaging portion 11 is separated from the pulling portion 12 by the tear line 14. In a specific implementation solution, the tear line 14 is a double-layer tear line, and the tear line 14 is the double-layer tear line, which is shown in FIG. 4. When the double-layer tear line is used, the pulling portion 12 can be separated from the packaging portion 11 by applying a relatively small force. When the tear line 14 is connected, the packaging portion 11 and the pulling portion 12 are in a one-piece structure. When the tear line 14 is disconnected, the packaging portion 11 is separated from the pulling portion 12, and the packaging portion 11 remains in the battery compartment; and the pulling portion 12 is connected to the battery 20, to pull the battery 20 out of the packaging portion 11.

To ensure that the pulling portion 12 and the packaging portion 11 can be separated from each other, the packaging film 10 provided in this embodiment of this application uses two different structural manners. One manner is shown in FIG. 4. In this manner, two tear lines 14 separate two sides of the pulling portion 12 from the packaging portion 11, and a through hole 15 is provided in the packaging film 10; and each tear line 14 extends to the through hole 15. In this way, the polling portion 12 is distinguished from the packaging portion 11 by the two tear lines 14 and the through hole 15. During specific disposing, the two tear lines 14 are arranged in parallel or approximately in parallel, and ends of the tear lines 14 extend to a same side of the packaging film 10. As shown in FIG. 4, one end of the tear line 14 is located at the through hole 15, and the other end is located at an edge of the packaging film 10. The packaging portion 11 obtained through division forms a concave-shaped structure, and the pulling portion 12 is inserted into a rectangular structure in a concave part of the packaging portion 11. When in use, the pulling portion 12 is pulled to break the two tear lines 14, and when the tear lines 14 are disconnected at a position of the through hole 15, the pulling portion 12 is separated from the packaging portion 11.

Figure 6:
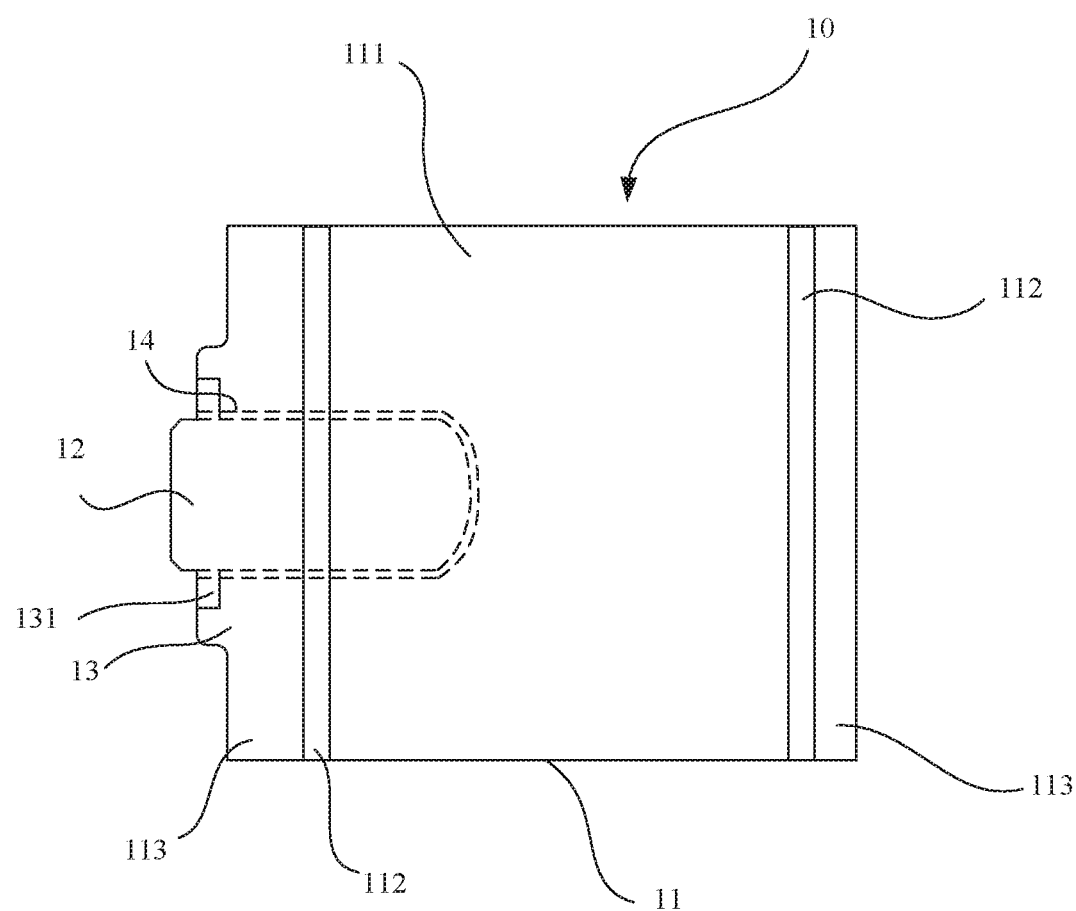
FIG. 6 is a schematic structural diagram of another packaging film according to an embodiment of this application.

The other manner is shown in FIG. 6. There is one tear line 14, and the one tear line 14 is in a U shape. Two ends of the U-shaped tear line 14 extend to a same side of the packaging film 10, so as to segment one part of the packaging film 10 to obtain the pulling portion 12. When the pulling portion 12 is pulled, the tear line 14 is gradually disconnected, and when the tear line 14 is disconnected, the pulling portion 12 is disconnected from the packaging portion 11. It should be understood that although the U-shaped tear line 14 is provided in this embodiment of this application, the tear line 14 with another shape can also be applied to this embodiment of this application, provided that it can be ensured that the tear line 14 can separate the pulling portion 12 from the packaging portion 11 when the tear line 14 is disconnected. If the tear line 14 is a fold line, the tear line 14 includes two parallel tear lines 14 and a V-shaped tear line 14 to form the pulling portion 12, and can also be applied to this embodiment of this application.

Figure 1:
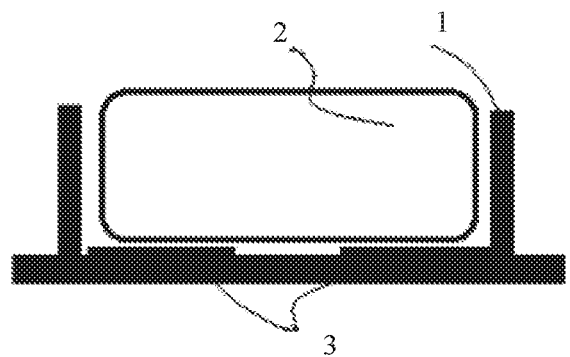
FIG. 1 is a schematic diagram of battery installation.
Figure 2:
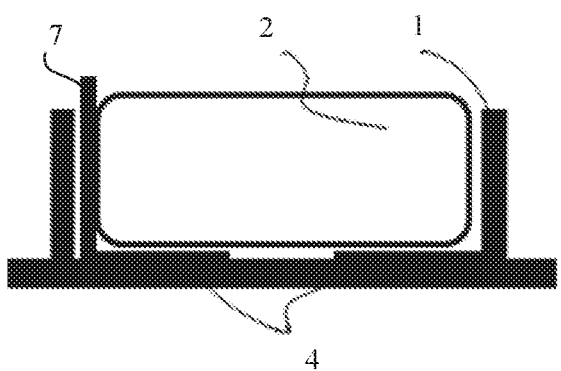
FIG. 2 is a schematic diagram of battery installation.
Figure 3:
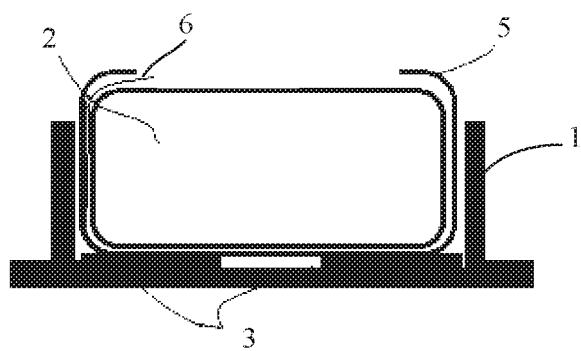
FIG. 3 is a schematic diagram of battery installation.

It can be learned from the foregoing description that the pulling portion 12 can be obtained through segmentation in different manners, and during demarcation of the pulling portion 12, the pulling portion 12 may be located at different positions on one side of the packaging film 10. Using a direction, for placing the packaging film 10, shown in FIG. 3 as a reference direction, the pulling portion 12 can be either near an upper part or a lower part of the packaging film 10. In a specific implementation, the pulling portion 12 is disposed at a middle position on one side of the packaging film 10. In this case, an adhesive force of on the two sides of the pulling portion 12 is relatively even, to help the battery 20 to be pulled out of the packaging film 10.

In the packaging portion 11 and the pulling portion 12 described above, the packaging portion 11 needs to be connected to the battery 20 and the battery compartment, and the pulling portion 12 needs to be connected only to the battery 20. The following describes in detail connection between the packaging portion 11, the pulling portion 12, the battery 20, and the battery compartment.

First, for the packaging portion 11, as shown in FIG. 4 and FIG. 6, glue-free areas in the packaging face segment the first adhesive into three parallel areas. Specifically, in the packaging face of the packaging portion 11, both the first surface packaging area 111 and the two second surface packaging areas 113 are provided with the first adhesive, and the side face packaging areas 112 are glue-free areas. Therefore, when the packaging face in the packaging portion 11 packages the battery 20, the packaging portion 11 is bonded to both the first surface and the second surface 21 of the battery 20. As shown in FIG. 7 and FIG. 8, the FIG. 7 shows a case in which the first surface packaging area 111 is bonded to the battery 20. In this case, the second surface packaging areas 113 are respectively located on both the sides of the battery 20. As shown in FIG. 8, when the second surface packaging areas 113 packages the battery 20, the second surface packaging areas 113 packages only partial areas on edges of both two sides of the second surface 21. In addition, because the side face packaging areas 112 are glue-free areas, when the packaging face packages the battery 20, the side face packaging areas 112 are not bonded to side faces of the battery 20, making it easier to pull the battery 20 out of the packaging film 10. For an adhesive face located in the packaging portion 11, only the first surface adhesive area 114 is provided with the second adhesive, and remaining areas are glue-free areas. When the battery 20 packaged in the packaging film 10 is fastened to the battery compartment, the second adhesive provided in the adhesive face of the packaging film 10 is bonded to the bottom of the battery compartment. During specific disposing, a plurality of adhesive areas 115 are disposed in the adhesive face of the packaging film 10, and each adhesive area 115 is provided with the second adhesive. As shown in FIG. 5, a plurality of single-row arranged adhesive area 115 is formed, and when the adhesive area 115 traverses the tear line 14, the adhesive area 115 is interrupted, to prevent the adhesive from being bonded to the pulling portion 12.

The adhesive may be disposed on a surface of the adhesive area 115 through coating, and the adhesive may also be applied in other known manners (for example, using a double-sided tape). Other methods can be all applied to this embodiment of the present application provided that it can be ensured that the adhesive area 115 has an adhesive force for the battery compartment.

For the pulling portion 12, the pulling portion 12 is connected only to the battery 20, and the first surface adhesive portion 114 in the pulling portion 12 is a glue-free area. To be specific, as shown in FIG. 5, the adhesive area 115 is interrupted when extending to the tear line 14, to prevent the adhesive from being bonded to the pulling portion 12. In addition, to connect the pulling portion 12 to the battery 20, the third adhesive is disposed in an upper portion of the pulling portion 12. As shown in FIG. 4, at least a part of the packaging face of the pulling portion 12 is provided with the third adhesive. For the pulling portion 12 provided in this embodiment of this application, when the packaging film 10 packages the battery 20, the pulling portion 12 spans a side wall of the battery 20 to be in contact with the first surface, one side face, and the second surface 21 of the battery 20. An area, of the pulling portion 12, on a side-wall side of the battery 20 is a glue-free area (a shaded area in the pulling portion 12 shown in FIG. 4), and the other side is a glue area, To be specific, the first surface packaging area 111 in the pulling portion 12 is provided with the first adhesive and the third adhesive, and the side face packaging areas 112 and the second surface packaging area 113 that are in the pulling portion 12 are glue-free areas. In a case in which such a structure is used, an edge of the pulling portion 12 is not bonded to the battery 20, and therefore the pulling portion 12 can be easily pulled up. In addition, when the foregoing structure is used, it can be ensured that the pulling portion 12 and the first surface of the battery 20 have a sufficient bonding area to withstand the pulling force applied for pulling out the battery 20. The third adhesive may be the same as the first adhesive. Further, the third adhesive is different from the first adhesive. When the third adhesive is different from the first adhesive, an adhesive force of the third adhesive is greater than an adhesive force of the first adhesive. Therefore, the adhesive force between the pulling portion 12 and the battery 20 is greater than the adhesive force between the packaging portion 11 and the battery 20, further ensuring that the pulling portion 12 can smoothly pull the battery 20 out of the packaging film 10.

In order to facilitate separation of the pulling portion 12 from the packaging portion 11, in this embodiment of this application, the packaging film 10 is structurally improved on a side at which the pulling portion 12 is located. As shown in FIG. 4 and FIG. 6, one side of the packaging film 10 has a protrusion portion 13 that extends beyond a side edge of the packaging film 10, and the tear line 14 extends to the protrusion portion 13. A part of the protrusion portion 13 belongs to the packaging portion 11, and the other part belongs to the pulling portion 12. In addition, in the protrusion portion 13, an edge of the protrusion portion 13 is provided with a notch 131 connected to each of the tear lines 14. When the pulling portion 12 needs to be pulled, a position strength of the notch 131 is relatively low, so that the pulling portion 12 can be separated from the packaging portion 11 conveniently. Preferably, the pulling, portion 12 is extended to an outer side of the protrusion portion 13, to form a convex-shaped structure. As shown in FIG. 8, a part that is of the pulling portion 12 and that extends to the outer side of the protrusion portion 13 may be used as a force receiving portion of the pulling portion 12. When the pulling portion 12 is not separated from the packaging portion 11, the pulling portion 12 is pulled by holding an area that is of the pulling portion 12 and that extends to the protrusion portion 13, so as to separate the pulling portion 12 from the packaging portion 11 and pull out the battery 20.

It can be learned from the foregoing description that a structure extending to the protrusion portion 13 is disposed in the pulling portion 12, to facilitate moving of the pulling portion 12, and further facilitate pulling up of the pulling portion 1. The area that is of the pulling portion 12 and that extends to the protrusion portion 13 is a glue-free area.

It should be understood that, when the packaging film 10 does not package the battery 20, to protect the first adhesive and the second adhesive from impurities, preferably, a protective film (which is not shown in the figure) is attached to the adhesive face of the packaging film 10 to protect the second adhesive. Similarly, a protective film is attached to the packaging face of the packaging film 10 to protect the first adhesive.

In addition, to ensure that the packaging film 10 can remain in the battery compartment when the battery 20 is pulled out, during selection of the first adhesive and the second adhesive, the adhesive force of the first adhesive is less than that of the second adhesive, and the first adhesive and the second adhesive may use commonly used glue in the prior art, for example, hot-melt adhesive.

It can be learned from the foregoing description that the packaging film 10 provided in this embodiment of this application is manufactured in a form of a one-piece structure, and a manufactured packaging film 10 has functions of packaging and removing the battery 20. Compared with the structure of packaging and removing the battery 20 in FIG. 3, such structure is simpler and the costs are lower.

As shown in FIG. 8, an embodiment of s application further provides a battery 20 module, where the battery 20 module includes a battery 20 and the packaging film 10 for packaging the battery 20 according to any one of the foregoing embodiments.

In the foregoing implementation solution, when the battery 20 is packaged, a protective film on the packaging film 10 needs to be removed, and then the packaging film 10 is bonded to the battery 20 by a first adhesive to package the battery 20. The packaging film 10 is in a one-piece structure, and is segmented into two different areas by a tear line 14, When the battery 20 needs to be removed, only a pulling portion 12 obtained through demarcation by the tear line 14 needs to be pulled, to separate the pulling portion 12 from a packaging portion 11 and pull the battery 2C) out of the battery compartment. This facilitates removal of the battery 20 and facilitates production and processing of the packaging film 10.

An embodiment of this application further provides a mobile terminal. The mobile terminal may be a common mobile phone, a tablet computer, a laptop computer, or the like. The mobile terminal includes a housing, a battery compartment disposed in the housing, and a battery 20 fastened in the battery compartment. The battery 20 is packaged with the packaging film 10 according to any one of the foregoing embodiments.

In the foregoing implementation solution, when the battery 20 is packaged, the protective film on the packaging film 10 needs to be removed, and then the packaging film 10 is bonded to the battery 20 by the first adhesive to package the battery 20. When the battery 20 module is installed in the battery compartment, a protective film for protecting a second adhesive on the packaging film 10 needs to be removed, and then the battery 20 module is placed in the battery compartment and is bonded to a bottom of the battery compartment by the second adhesive. In the foregoing implementation solution, the packaging film 10 is formed as a one-piece structure, and the packaging film 10 is segmented into two different areas by a tear line 14. When the battery 20 needs to be removed, only the pulling portion 12 obtained through demarcation by the tear line 14 needs to be pulled, to separate the pulling portion 12 from the packaging portion 11 and pull the battery 20 out of the battery compartment. This facilitates removal of the battery 20 and facilitates production and processing of the packaging film 10.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packaging film, comprising:
   a packaging portion comprising:
      a packaging face configured to face a battery and comprising:
         a first area configured to package a side wall of the battery, wherein the first area comprises a glue-free area; and
         a second area comprising a first adhesive having a first adhesive force; and
      an adhesive face configured to face a battery compartment, wherein the adhesive face comprises a second adhesive having a second adhesive force, and wherein the first adhesive force is less than the second adhesive force;
   a pulling portion, wherein the pulling portion and the packaging portion are demarcated by at least two tear lines, and wherein the pulling portion is configured to pull and separate from the packaging portion by disconnecting the two tear lines;
   a protrusion portion that extends beyond a side edge of the packaging film; and
   a through hole, wherein each of the two tear lines extends from the protrusion portion to the through hole.

2. The packaging film of claim 1, wherein the at least two tear lines are arranged in parallel.

3. The packaging film of claim 1, wherein the at least two tear lines comprise a U-shaped portion, and wherein two ends of the U-shaped portion extend to a same side of the packaging film.

4. The packaging film of claim 1, wherein an edge position of the protrusion portion comprises a notch coupled to each of the at least two tear lines.

5. The packaging film of claim 1, wherein a part of the pulling portion that extends to the protrusion portion comprises another glue-free area, and wherein the pulling portion is partially outside the protrusion portion.

6. The packaging film of claim 1, wherein the at least two tear lines comprise a double-layer tear line.

7. The packaging film of claim 1, wherein a protective film is attached to the adhesive face.

8. A mobile terminal, comprising:
   a housing;
   a battery compartment disposed in the housing; and
   a battery fastened in the battery compartment, wherein the battery is packaged with a packaging film, and wherein the packaging film comprises:
      a packaging portion comprising:
         a packaging face facing the battery and comprising:
            a first area packaging a side wall of the battery, wherein the first area comprises a glue-free area; and
            a second area comprising a first adhesive having a first adhesive force; and
         an adhesive face facing the battery compartment, wherein the adhesive face comprises a second adhesive having a second adhesive force, and wherein the first adhesive force is less than the second adhesive force;
      a pulling portion, wherein the pulling portion and the packaging portion are demarcated by at least two tear lines, and wherein the pulling portion is configured to pull and separate from the packaging portion by disconnecting the two tear lines;
      a protrusion portion that extends beyond a side edge of the packaging film; and
      a through hole, wherein each of the two tear lines extends from the protrusion portion to the through hole.

9. The mobile terminal of claim 8, wherein the at least two tear lines are arranged in parallel.

10. The mobile terminal of claim 8, wherein the at least two tear lines comprise a U-shaped portion, and wherein two ends of the U-shaped portion extend to a same side of the packaging film.

11. The mobile terminal of claim 8, wherein an edge position of the protrusion portion comprises a notch connected to each of the at least two tear lines.

12. The mobile terminal of claim 8, wherein a part of the pulling portion that extends to the protrusion portion comprises another glue-free area, and wherein the pulling portion is partially outside the protrusion portion.

13. The mobile terminal of claim 8, wherein the at least two tear lines comprise a double-layer tear line.

14. The mobile terminal of claim 8, wherein a protective film is attached to the adhesive face.

15. The mobile terminal of claim 8, wherein the packaging film comprises a one-piece structure.

16. The mobile terminal of claim 8, wherein the first adhesive and the second adhesive comprise different adhesives.

17. The mobile terminal of claim 8, wherein the first adhesive and the second adhesive comprise the same adhesive.

18. The mobile terminal of claim 8, wherein the mobile terminal comprises a mobile phone.

19. The mobile terminal of claim 8, wherein the mobile terminal comprises a tablet computer.

20. The mobile terminal of claim 8, wherein the mobile terminal comprises a laptop computer.

\* \* \* \* \*